R. V. WHATLEY.
ROLL FILM ATTACHMENT FOR PLATE CAMERAS.
APPLICATION FILED DEC. 8, 1913.
1,191,632. Patented July 18, 1916.
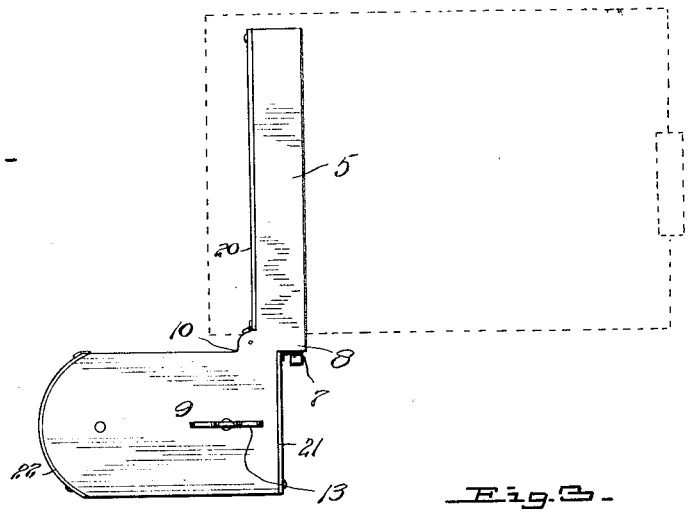
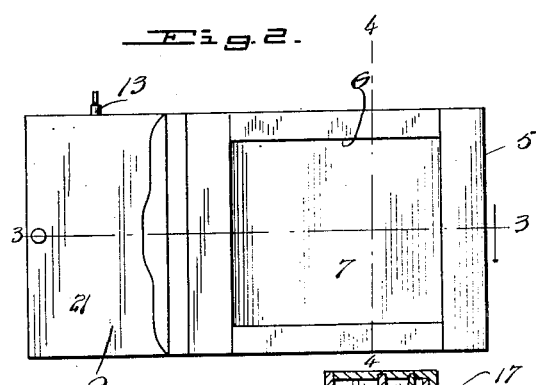
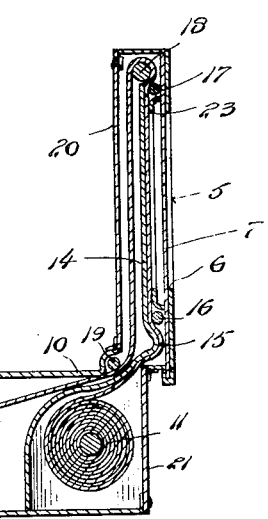
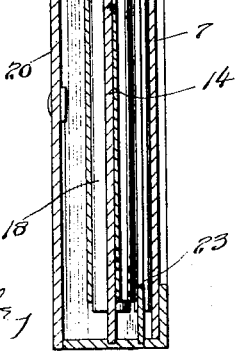
Inventor
R. V. Whatley.
Witnesses
By
Attorneys

UNITED STATES PATENT OFFICE.

RILEY V. WHATLEY, OF DECATUR, TEXAS.

ROLL-FILM ATTACHMENT FOR PLATE-CAMERAS.

1,191,632.  Specification of Letters Patent.  Patented July 18, 1916.

Application filed December 8, 1913. Serial No. 805,342.

*To all whom it may concern:*

Be it known that I, RILEY V. WHATLEY, a citizen of the United States, residing at Decatur, in the county of Wise, State of Texas, have invented certain new and useful Improvements in Roll-Film Attachments for Plate-Cameras; and I do hereby declare the following to be a full, clear, and exact description of the invention, such as will enable others skilled in the art to which it appertains to make and use the same.

This invention relates to new and useful improvements in attachments for cameras.

The object of the present invention resides in the provision of a device adapted to be associated with a plate camera in the same manner as the usual plate holder is associated therewith, and carrying a roll of film in such manner that various sections thereof can be successfully exposed in the focal-plane, the device being so constructed that it can be used with any conventional form of plate camera.

A further object of the invention resides in the provision of such a device wherein the roll of film may be quickly and easily inserted and properly positioned and which holds the film so that there is no likelihood of light striking the same to injure it.

With these and other objects in view, the invention resides in the novel combination, formation and arrangement of parts to be more fully hereinafter described and illustrated in the accompanying drawings and particularly pointed out in the claim hereto appended.

Reference is had to the accompanying drawings wherein similar characters of reference designate corresponding parts throughout the several views, and in which:

Figure 1 is a top plan view of the device, associated with a camera. Fig. 2 is a front elevational view of the device, Fig. 3 is a horizontal sectional view on the line 3—3 of Fig. 2, and Fig. 4 is a vertical sectional view through the device on the line 4—4 of Fig. 2.

Referring now more particularly to the accompanying drawings, 5 designates a casing similar in outline to a conventional plate holder and which is adapted to receive a portion of the film to expose the same and which is insertible in the plate camera in the same manner as is the plate holder. The front of the casing is cutaway as at 6 to provide an exposure opening and a shutter 7 is slidably inserted in one end portion 8 of the casing and is adapted to cover the opening.

For holding the rolls of film, a casing 9 is provided which has one side 10 thereof secured to and communicating with the end 8 of the exposure casing. Journaled in this casing are the usual film spools 11 and 12 respectively, the winding spool being operated by the usual member 13 extending outwardly of the casing. A partition wall 14 is disposed in the casing and extends from the other wall of the casing to a point adjacent the outer end of the casing 5. That portion of the partition adjacent the end 8 of the casing 5 is bowed forwardly as at 15, and carried by the casing 5 adjacent this bowed portion 15 is a roller 16. A similar roller 17 is carried at the outer end portion of the casing and carried at the central portion of the outer end of the casing is a roller 18. The bowed portion 15 serves to provide a relative extensive bearing surface for the film and owing to its curved shape will appreciably resist the sliding movement of the film and assist in maintaining the latter taut so that the film will feed evenly and regularly as the roll is run out. The film is then trained around the bowed portion 15 adjacent the juncture of the two casings and is wound around the roller 11. To facilitate initially positioning the film in this manner, the rear face of the casing 5 is provided with a door 20. The ends of the casing 9 are provided with doors 21 and 22 whereby access may be had to the rollers 11 and 12 respectively. Thus it is observed that should one of the doors become open accidentally, the light will only affect the film on the adjacent roller. Light entering the exposure opening 6 is prevented from penetrating past the surface of the film desired to be exposed by a plate 23 which is disposed between the rollers 16 and 17 and over which the film contacts.

What is claimed is:

A film roll holder comprising an exposure casing, a film case secured to one end of the exposure casing and communicating with the latter, a partition extending from side to side of both of said casings and provided with a bowed portion disposed within the exposure casing adjacent its junction with the film casing, a roller in the exposure casing contiguous with the top edge of the partition, and a pair of rollers in the exposure casing extending across the front face of the partition for confining a film between same and the partition.

In testimony whereof, I affix my signature, in the presence of two witnesses.

RILEY V. WHATLEY.

Witnesses:
  J. P. WHATLEY,
  W. R. LONGLEY.